United States Patent [19]
Van Loon et al.

[11] Patent Number: 5,870,400
[45] Date of Patent: Feb. 9, 1999

[54] METHODS AND APPARATUS FOR EXCHANGING MESSAGES BETWEEN SYSTEMS HAVING PARTIALLY INCOMPATIBLE COMMUNICATION

[75] Inventors: Johannes Marie Van Loon, Zoetermeer; Christiaan Marie Wilhelmus Gabriël, Leiden; Rudolf Hendrik Johan Barenbrug, Nieuw Vennep; Jacobus Tuyt, Zoetermeer, all of Netherlands

[73] Assignee: Koninklijke PTT Nederland N.V., Netherlands

[21] Appl. No.: 845,013

[22] Filed: Apr. 22, 1997

Related U.S. Application Data

[62] Division of Ser. No. 412,954, Mar. 29, 1995.

[30] Foreign Application Priority Data

Apr. 28, 1994 [NL] Netherlands ............................ 9400682

[51] Int. Cl.⁶ ...................................................... H04J 3/16
[52] U.S. Cl. ............................ 370/466; 370/469; 370/470
[58] Field of Search ...................................... 370/466, 465, 370/467, 468, 469, 389, 392, 419, 470, 471

[56] References Cited

U.S. PATENT DOCUMENTS

| | | |
|---|---|---|
| 4,943,978 | 7/1990 | Rice . |
| 5,323,392 | 6/1994 | Ishii et al. ................................ 370/466 |
| 5,410,754 | 4/1995 | Klotzbach et al. ...................... 370/466 |
| 5,465,365 | 11/1995 | Winterbottom . |
| 5,497,373 | 3/1996 | Hulen et al. ............................. 370/465 |
| 5,594,721 | 1/1997 | Pan ......................................... 370/465 |
| 5,715,249 | 3/1998 | Miyamoto ............................... 370/466 |

OTHER PUBLICATIONS

E. Benhamou et al., "Multilevel Internetworking Gateways: Architecture and Applications", Computer, vol. 16, No. 9, 1983, pp. 27–34.

D. Einert et a., "The SNATCH Gateway: Translation of Higher Level Protocols", Journal of Telecommunication Networks, vol. 2, No. 1, 1983, pp. 83–102.

D. Hoge et al., "A Comparison of Protocol Conversion Methods for the Retrofit of Scada Systems", IEEE Industrial Applications Society 35th Annual Petroleum and Chemical Industry Conference, Dallas, Texas, Sep. 1988, pp. 245–248.

*Primary Examiner*—Douglas W. Olms
*Assistant Examiner*—Shick Hom
*Attorney, Agent, or Firm*—Michaelson & Wallace; Peter L. Michaelson

[57] ABSTRACT

The methods and devices according to the invention supplement messages, which are to be exchanged between systems based on different protocol versions and which are provided with an information element of a second type, with an information element of a first type, and vice versa. As a result, greater design freedom in the development of subsequent compatible protocol versions, as well as subsequent non-compatible protocol versions, is obtained. Further, systems based on non-compatible protocol versions can even communicate directly with any type of receiving system. Furthermore, in this arrangement the drawback of needing to know, in advance, the protocol version on which the receiving system is based, does not apply.

3 Claims, 2 Drawing Sheets

METHODS AND APPARATUS FOR EXCHANGING MESSAGES BETWEEN SYSTEMS HAVING PARTIALLY INCOMPATIBLE COMMUNICATION

This application is a division of co-pending patent application Ser. No. 08/412,954 filed on Mar. 29, 1995.

BACKGROUND OF THE INVENTION

The invention relates to a method for exchanging, between systems, a message which comprises at least one information element.

Such a method is generally known. During a certain transition time, one system (such as, for example, a telephone set) is based, for example, on a first (lower, old-fashioned) protocol version, and another system (such as, for example, a telephone exchange) is based, for example, on a second (higher, modern) protocol version. If all the protocol procedures of the first (lower) protocol version are incorporated in the second (higher) protocol version, a message which is based on the first (lower) protocol version and comprises an information element of a first type, is, as a result, handled in an identical manner by both systems, while a message which is based on the second (higher) protocol version and comprises an information element of a second type, in contrast is ignored by a system based on the first (lower) protocol version and is handled by a system based on the second (higher) protocol version.

This known method has the drawback, inter alia, that as a result of this method to be applied, the development of subsequent protocol versions can take place only with limited design freedom, since a message based on a lower protocol version should be handled in an identical manner by systems based on lower and higher protocol versions. Moreover, according to the known method, messages based on a higher protocol version are exchanged which have no significance whatsoever to a system based on a lower protocol version. Further, a system based on said subsequent protocol version has fewer options at its disposal than a system which would have been developed with complete design freedom, since a message to be dispatched from a system based on said subsequent protocol version to a system based on a lower protocol version should be based on the lower protocol version to permit communication between the two systems.

SUMMARY OF THE INVENTION

An object of the invention is to provide a method for exchanging, between systems, a message comprising at least one information element which permits subsequent protocol versions to be developed with greater design freedom.

To this end, in the method according to the invention, a message which comes from a second system based on at least a second protocol version, which is to be supplied to a specific system based on at least a specific protocol version, and which comprises an information element of a second type, is provided with an information element of a first type, wherein an information content of the information element of a first type substantially agrees with at least a portion of an information content of the information element of a second type.

As a result of a message which comes from a second system based on at least a second (higher) protocol version, which is to be supplied to a specific system based on a specific protocol version (such as, for example, a first system based on a first protocol version), and which comprises an information element of a second type, being provided with an information element of a first type, it is no longer necessary for a message, which is to be dispatched from a system based on a higher protocol version to a system based on a lower protocol version, to be based absolutely on the lower protocol version. Since an information content of the information element of a first type substantially agrees with at least a portion of an information content of the information element of a second type, handling of the message provided with an information element of a first type by a first system based on a first (lower) protocol version, and handling of a message provided with an information element of a second type by a second system based on a second (higher) protocol version will virtually agree with one another, at least in part.

The invention is based, inter alia, on the insight that if a message comprises both an information element of a first type and an information element of a second type, the message is suitable for being handled both by a first system based on a first protocol version and by a second system based on a second protocol version. Thus, when a subsequent protocol version is being designed, very much, it is no longer necessary to have to take account of a previous protocol version, since a second system based on a second protocol version no longer absolutely needs to dispatch a message provided with an information element of a first type to a first system based on a first protocol version. Consequently, greater design freedom is available when subsequent protocol versions are developed.

It is known per se, for example by using a so called network adapter, to convert a message comprising an information element of a first type into a message comprising an information element of a second type. A drawback in this case is that it is necessary to know in advance whether the receiving system is based on a first protocol version or on a second protocol version, and that if a system based on a protocol version is replaced by a system based on a different protocol version, the network adapter should also be replaced. In the case of multipoint links, in particular, this is obviously very disadvantageous. It is therefore not known in this context to supplement a message which comprises an information element of a second type with an information element of a first type. Thereby the problem of the desired greater design freedom is solved, without the drawback of the required familiarity with the receiving system being introduced.

In a first embodiment of the method according to the invention, a message which comes from a first system based on at least a first protocol version, which is to be supplied to a specific system based on at least a specific protocol version, and which comprises an information element of a first type, is provided with an information element of a second type, wherein an information content of the information element of a second type substantially agrees with an information content of the information element of a first type.

As a result of a message which comes from a first system based on at least a first protocol version, which is to be supplied to a specific system based on at least a specific protocol version (such as, for example, a second system based on a second protocol version), and which comprises an information element of a first type, being provided with an information element of a second type, a message based on a lower protocol version need not be handled in an identical manner by systems based on lower and higher protocol versions, which further increases the design freedom.

In a second embodiment of the method according to the invention, a message which comes from a second system based on at least a second protocol version, which is to be supplied to a specific system based on at least a specific protocol version, and which comprises a first information element of a second type and a second information element of a second type, is provided with an information element of a first type, wherein an information content of the information element of a first type substantially agrees with an information content of the first information element of a second type.

In this case, a first information element of a second type has an information content which is important to a system based on a first protocol version, and a second information element of a second type has an information content which is not important to a system based on a first protocol version. Thus, only that portion of a message is supplemented which is important to the receiving system. This increases the efficiency of the method according to the invention.

The invention further relates to a method for exchanging, between systems, a message which comprises at least one information element, a third system based on at least a first and a second protocol version being provided with a first subsystem based on a first protocol version and a second subsystem based on a second protocol version.

If not all the protocol procedures of the first (lower) protocol version are incorporated in the second (higher) protocol version, a third system which is based on a first and second protocol version, should be provided with a first subsystem based on a first protocol version and a second subsystem based on a second protocol version. As a result, at least one message which is based on the first (lower) protocol version and which comprises an information element of the first type, is handled by a first subsystem and is not handled by a second subsystem, while at least one message which is based on the second (higher) protocol version and which comprises an information element of a second type, is not handled by a first subsystem and is handled by a second subsystem.

Another object of the invention is to provide a method of the type mentioned, which permits subsequent protocol versions to be developed with greater design freedom.

In this method according to the invention, a message which comes from a second subsystem based on a second protocol version, which is to be supplied to a specific system based on at least a specific protocol version, and which comprises an information element of a second type, is provided with an information element of a first type, wherein an information content of the information element of a first type substantially agrees with at least a portion of an information content of the information element of a second type.

As a result of a message which comes from a second subsystem based on at least a second (higher) protocol version, which is to be supplied to a specific system based on a specific protocol version (such as, for example, a first system based on a first protocol version), and which comprises an information element of a second type, being provided with an information element of a first type, direct communication from a subsystem based on a higher protocol version to a system based on a lower protocol version is possible.

In a first embodiment of said method according to the invention, a message which comes from a first subsystem based on a first protocol version, which is to be supplied to a specific system based on at least a specific protocol version, and which comprises an information element of a first type, is provided with an information element of a second type, wherein an information content of the information element of a second type substantially agrees with an information content of the information element of a first type.

As a result of a message which comes from a first subsystem based on a first protocol version, which is to be supplied to a specific system based on at least a specific protocol version (such as, for example, a second system based on at least a second protocol version), and which comprises an information element of a first type, being provided with an information element of a second type, direct communication from a subsystem based on a lower protocol version to a system based on a higher protocol version is possible.

In a second embodiment of said method according to the invention, a message which comes from a second subsystem based on a second protocol version, which is to be supplied to a specific system based at least a specific protocol version, and which comprises a first information element of a second type and a second information element of a second type, is provided with an information element of a first type, wherein an information content of the information element of a first type substantially agrees with an information content of the first information element of a second type.

In this case, a first information element of a second type has an information content which is important to a system based on a first protocol version, and a second information element of a second type has an information content which is not important to a system based on a first protocol version. Thus, only that portion of a message is supplemented which is important to the receiving system. This increases the efficiency of said method according to the invention.

The invention yet further relates to a device for exchanging, between systems, a message which comprises at least one information element.

It is a yet further object of the invention, inter alia, to provide a device of the type stated, which permits subsequent protocol versions to be developed with greater design freedom.

The device according to the invention is provided with an input for receiving a message which comprises an information element of a second type, memory means for storing information elements of a first type, selection means for selecting an information element of a first type which, at least in part, has substantially the same information content as the information element of a second type, and an output for generating a message which comprises both the information element of a second type and the selected information element of a first type.

A first embodiment of said device according to the invention is provided with an input for receiving a message which comprises an information element of a first type, memory means for storing information elements of a second type, selection means for selecting an information element of a second type which, at least in part, has substantially the same information content as the information element of a first type, and an output for generating a message which comprises both the information element of a first type and the selected information element of a second type.

A second embodiment of said device according to the invention is provided with an input for receiving a message which comprises a first information element of a second type and a second information element of a second type, memory means for storing information elements of a first type, selection means for selecting an information element of a first type which, at least in part, has substantially the same information content as the first information element of a second type, and an output for generating a message which comprises the first information element of a second type, the second information element of a second type, and the selected information element of a first type.

The invention also relates to a system based on at least one protocol version, for exchanging a message with another system based on at least one protocol version, the message comprising at least one information element of a specific type, which system is provided with the device (or an embodiment thereof) according to the invention.

BRIEF DESCRIPTION OF THE DRAWINGS

The invention will be explained in more detail with reference to a specific embodiment depicted in the figures, in which.

DETAILED DESCRIPTION

Figure 1:
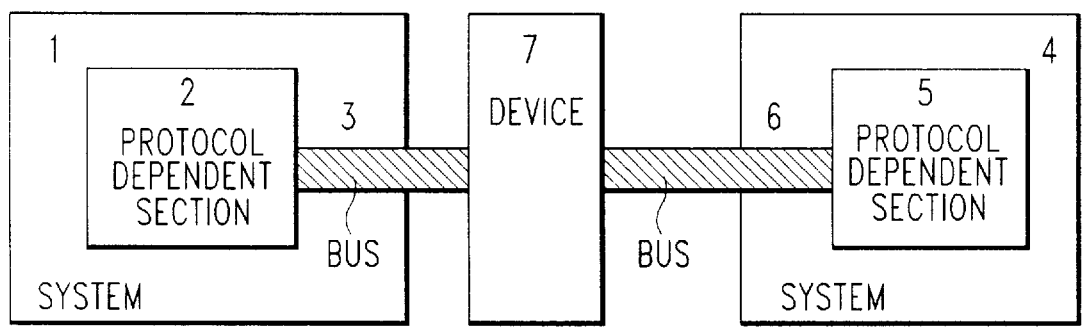
FIG. 1 shows two systems which are each based on one protocol version, with a first device according to the invention situated between the systems.

The unit depicted in FIG. 1 consists of a system 4, of which a protocol-dependent section 5, based on one protocol version, is linked via a bus 6 to first device 7. Device 7 is further linked, via a bus 3, to a protocol dependent section 2, based on one protocol version, of a system 1. If a protocol dependent section of a system is based on a first (lower) protocol version, this will result in, for example, the system dispatching a message which comprises an information element of a first type. If a protocol-dependent section of a system is based on a second (higher) protocol version, this will result in, for example, the system dispatching a message which comprises an information element of a second type. In this situation, a message consists, for example, of eight bytes A, B, C, D, E, F, G and H; a header being formed by bytes A and B, an information element of a first type being formed by bytes C and D, an information element of a second type being formed by bytes E and F, and a subsequent information element of a second type being formed by bytes G and H.

Figure 2:
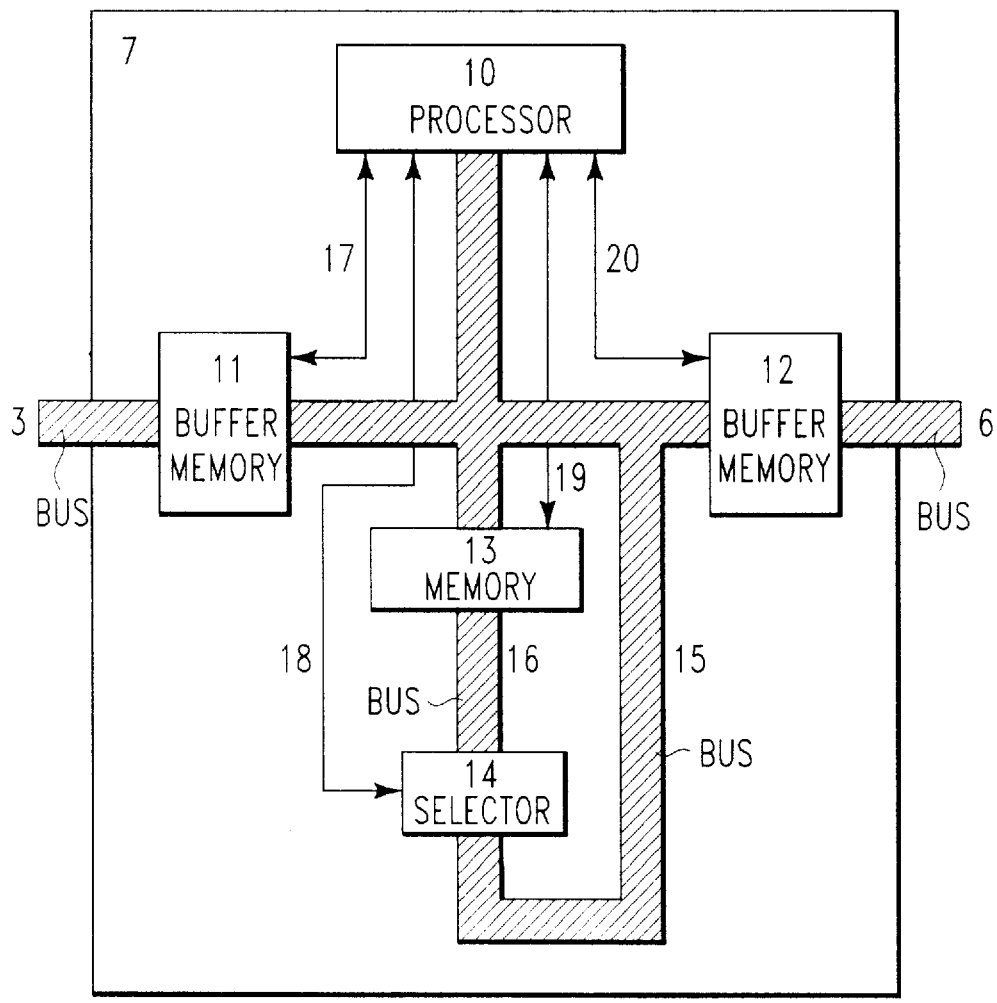
FIG. 2 shows the first device according to the invention.

The first device 7, depicted in FIG. 2, comprises a processor 10, a buffer memory 11 linked to bus 3, a buffer memory 12 linked to bus 6, memory means 13 and selection means 14. Memory means 13 and selection means 14 are linked to one another via a bus 16 and are each, like processor 10, buffer memory 11 and buffer memory 12, linked to a bus 15, via which bus 15 the internal data exchange in device 7 takes place. Further, processor 10 is linked, via a control link 17, to buffer memory 11, via a control link 18, to selection means 14, via a control link 19, to memory means 13, and via a control link 20, to buffer memory 12.

The mode of operation of device 7 in one direction is as follows, on the assumption that section 2 of system 1 is based on a second (higher) protocol version. A message which comes from system 1 and comprises an information element of a second type (bytes E and F) is fed, via bus 3, to buffer memory 11 of device 7. By means of a control signal, received via control link 17, processor 10 is informed of the arrival of the message. In response to the receipt of the control signal, the message, via bus 15, is analyzed by processor 10 (either by analysis of the header, bytes A and B, or by analysis of the content of the remaining portion of the message, bytes C, D, E, F, G and H). Then, the information element of a second type (bytes E and F) of the message is fed, via bus 15, to selection means 14 which, for example, stores said information element (bytes E and F) in response to a control signal coming from processor 10 via control link 18. Thereafter, processor 10 is informed of the arrival of said information element (bytes E and F) at the selection means 14. In response to a control signal coming from processor 10 via control link 19, memory means 13 successively generate various information elements, stored in memory means 13, of a second type, which are supplied to selection means 14 via bus 16. To this end, memory means 13 are equipped, for example, with a table having two columns, the first column comprising information elements of a first type and the second column comprising information elements of a second type, where information elements, situated on the same row, of a first and second type, respectively, have, at least in part, substantially the same information content. Selection means 14 compare each information element of a second type which has arrived via bus 16 with the stored information element of a second type (bytes E and F) and, in case of identity, inform processor 10 by means of a control signal via control link 18. In response thereto, processor 10 generates a subsequent control signal via control link 19 to memory means 13 which, in response thereto, generate that information element of a first type which is situated on the same row as the selected information element of a second type. The selected information element of a first type is fed, via bus 15, to buffer memory 12 which stores the selected information element of a first type in response to a control signal coming from processor 10 and supplied via control link 20 (bytes C and D). Then the remaining portion of the message (bytes A, B, E, F, G and H) stored in buffer memory 11 is fed, via bus 15, to buffer memory 12 which stores said remaining portion of the message, whereupon the message which has thus been stored in buffer memory 12 and which now comprises both an information element of a first type (bytes C and D) and an information element of a second type (bytes E and F) can be dispatched to system 4 via bus 6. Independent of the protocol version on which section 5 of system 4 is based, system 4 now can process this message without it having been necessary when the second protocol version was designed to take the first protocol version very much into account.

The next information element of a second type (bytes G and H) is therefore, in this case, fed directly via bus 15 to buffer memory 12, without a corresponding, in terms of information content, information element of a first type being looked up, for example (a) because the location of the next information element of a second type (bytes G and H) has shown that with respect to said next information element of a second type (bytes G and H) a corresponding, in terms of information content, information element of a first type does not exist, or (b) because it has been found, with respect to an information content of said next information element of a second type (bytes G and H), that said information content is equal, for example, to the value zero.

In a simplest form, buffer memory 11 is equipped with a memory which can be linked, for example, via switch-over means, to one of the two buses 3 and 15, so that messages can be written in and read out via a first of the two buses 3 and 15 and messages can be written in and read out via a second of the two buses 3 and 15, under the control of a control signal which can be transmitted by processor 10 via control link 17. In addition, buffer memory 11 should be provided with a detection means for detecting the arrival of a message and for informing, in response thereto, via control link 17, processor 10 of said arrival. Such a detection means, which, for example, periodically scans the content of buffer memory 11 and, in the event of a content detected being not equal to the value zero or of a changed content detected, generates a control signal, is not needed in the case of a more direct link between processor 10 and system 1 (possibly via bus 3), via which more direct link, processor 10 is then informed of an arriving message, and via which more direct link, processor 10 can then inform system 1 of a message to be transmitted to system 1. In a more complicated form, buffer memory 11 is equipped, for example, with two memories which are linked to bus 3 and bus 15, respectively, and which can exchange data with one another, via a third memory and an internal bus structure, so that an incoming and outgoing message can be handled more efficiently. The above obviously also applies to buffer memory 12.

Memory means 13, in a simplest form, comprise a table consisting of at least two columns, it being possible, (a) in response to a control signal to be supplied by processor 10 via control link 19, for all the information elements from one of the columns to be read out successively via bus 16, and, (b) in response to a subsequent control signal to be supplied by processor 10 via control link 19, for an information element from a different column and situated on the same row as the information element read out at that instant being read out via bus 15. Reading out, on the one hand, via bus 16, and on the other hand, via bus 15 could be implemented by means of switch-over means which can be controlled by processor 10 via control link 19. Such switch-over means is not needed if bus 16 is dispensed with and the entire communication between memory means 13 and selection means 14 takes place via bus 15.

In a simplest form, selection means 14 comprise a comparator device for comparing two information elements supplied and for generating, in the event of identity, a control signal via control link 18.

In a more complicated form, memory means 13 and selection means 14 together are equipped with a processor means which permits independent selection of an information element, without the intervention of processor 10. Such a separate processor means further permits more efficient selection by, for example, successively generating only a relevant portion of all the information elements belonging to a column, based on a given structure of the information element coming from buffer memory 10.

Both for the simplest forms of memory means 13 and selection means 14 and for the more complicated forms of memory means 13 and selection means 14, it is therefore possible to do without bus 16 by arranging for the communication between memory means 13 and selection means 14 to take place entirely via bus 15. Further, it would even be possible for bus 3, bus 6 and bus 15 to be combined into one bus, in which case buffer memories 11 and 12 should then be attached to that one bus in the same manner as is already the case, for example, with processor 10. However, if buses 3, 6, and 15 are combined into one bus, measures should be taken to prevent the two systems 1 and 4 from exchanging messages without the intervention of device 7.

The defined message structure of eight bytes A to H inclusive is completely arbitrary. Thus, for example, the number of bytes per information element of a first type could be different from the number of bytes per information element of a second type. It is further possible for a message to consist of different cells, there being, for each cell, an information element provided with a separate header and of a specific type, in which arrangement device 7 will then insert and/or remove the cells.

Two information elements of a first and second type, respectively, which have substantially the same information content, are meant to refer to information elements which, if fed to systems based on first and second, respectively, mutually compatible protocol versions, result in the same protocol procedures. The system based on the second protocol version is then equipped with the same protocol procedures as the system based on the first protocol version, but is additionally also equipped with further protocol procedures. Of two systems based on incompatible protocol versions, in contrast, the one system is equipped with at least one protocol procedure which is not available to the other system and vice versa, which will be discussed extensively in the descriptions of the FIG. 3 and 4.

The mode of operation of device 7 in the other direction is as follows, on the assumption that section 5 of system 4 is based on a first (lower) protocol version and on the assumption that device 7 is unfamiliar with the protocol version on which section 2 of system 1 is based. A message which comes from system 4 and comprises an information element of a first type (bytes C and D) is fed, via bus 6, to buffer memory 12 of device 7. By means of a control signal via control link 20, processor 10 is informed of the arrival of the message. In response to the control signal, the message, via bus 15, is analyzed by processor 10 (either by analysis of the header, bytes A and B, or by analysis of the content of the remaining portion of the message, bytes C, D, E, F, G and H). Then the information element of a first type (bytes C and D) of the message is fed, via bus 15, to selection means 14 which, for example, store said information element (bytes C and D) in response to a control signal coming from processor 10 via control link 18. Thereafter, processor 10 is informed of the arrival of said information element (bytes C and D). In response to a control signal coming from processor 10 via control link 19, memory means 13 successively generate various information elements, stored in memory means 13, of a first type, which are supplied to selection means 14 via bus 16. To this end, memory means 13 are equipped, for example, with a table having two columns, the first column comprising information elements of a first type and the second column comprising information elements of a second type, where information elements, situated on the same row, of a first and second type, respectively, have, at least in part, substantially the same information content. Selection means 14 compare each information element of a first type which has arrived via bus 16 with the stored information element of a first type (bytes C and D) and in case of identity inform processor 10 by means of a control signal via control link 18. In response thereto, processor 10 generates a subsequent control signal via control link 19 to memory means 13 which, in response thereto, generate that information element of a second type which is situated on the same row as the selected information element of a first type. Said selected information element of a second type is fed, via bus 15, to buffer memory 11 which stores said selected information element of a second type in response to a control signal coming from processor 10 and supplied via control link 20 (bytes E and F). Then, a remaining portion of the message (bytes A, B, C and D) stored in buffer memory 12 is fed, via bus 1, to buffer memory 11 which stores said remaining portion of the message, whereupon the message which has thus been stored in buffer memory 11 and which now comprises both an information element of a first type (bytes C and D) and an information element of a second type (bytes E and F) can be dispatched to system 1 via bus 3. Independent of the protocol version on which section 2 of system 1 is based, system 2 now can process this message without it having been necessary when the second protocol version was designed to take the first protocol version very much into account.

The mode of operation of device 7 in the other direction further is as follows, on the assumption that section 5 of system 4 is based on a first (lower) protocol version and now on the assumption that device 7 is familiar with the second protocol version on which section 2 of system 1 is based. This familiarity is implemented, for example, by causing processor 10 to store, in a memory not shown in FIG. 2, that messages coming from system 1 solely comprise information elements of a second type, or by adjusting device 7 manually. A message which comes from system 4 and comprises an information element of a first type (bytes C and D) is fed, via bus 6, to buffer memory 12 of device 7. By means of a control signal via control link 20, processor 10 is informed of the arrival of said message. In response to the control signal, the message, via bus 15, is analyzed by processor 10 (either by analysis of the header, bytes A and B, or by analysis of the content of the remaining portion of the message, bytes C, D, E, F, G and H). Then, the information element of a first type (bytes C and D) of the message is fed, via bus 15, to selection means 14 which, for example, store said information element (bytes C and D) in response to a control signal coming from processor 10 via control link 18. Thereafter, processor 10 is informed of the arrival of said information element (bytes C and D). In response to a control signal coming from processor 10 via control link 19, memory means 13 successively generate various information elements, stored in memory means 13, of a first type, which are supplied to selection means 14 via bus 16. To this end, memory means 13 are equipped, for example, with a table having two columns, the first column comprising information elements of a first type and the second column comprising information elements of a second type, where information elements, situated on the same row, of a first and second type, respectively, have, at least in part, substantially the same information content. Selection means 14 compare each information element of a first type which has arrived via bus 16 with the stored information element of a first type (bytes C and D) and in case of identity inform processor 10 by means of a control signal via control link 18. In response thereto, processor 10 generates a subsequent control signal via control link 19 to memory means 13 which, in response thereto, generate that information element of a second type which is situated on the same row as the selected information element of a first type. The selected information element of a second type is fed, via bus 15, to buffer memory 11 which stores said selected information element of a second type in response to a control signal coming from processor 10 and supplied via control link 17 (bytes E and F). Then, a remaining portion of the message (bytes A and B) stored in buffer memory 12 is fed, via bus 15, to buffer memory 11 which stores said remaining portion of the message, whereupon the message which has thus been stored in buffer memory 11 and which now comprises only an information element of a second type (bytes E and F) can be dispatched to system 1 via bus 3.

The device for exchanging, between systems, a message which comprises at least one information element, is provided according to the invention with an input (bus 3) for receiving a message which comprises an information element of a second type, memory means 13 for storing information elements of a first type, selection means 14 for selecting an information element of a first type which, at least in part, has substantially the same information content as the information element of a second type, and an output (bus 6) for generating a message which comprises both the information element of a second type and the selected information element of a first type.

A first embodiment of said device according to the invention is provided with an input (bus 6) for receiving a message which comprises an information element of a first type, memory means 13 for storing information elements of a second type, selection means 14 for selecting an information element of a second type which, at least in part, has substantially the same information content as the information element of a first type, and an output (bus 3) for generating a message which comprises both the information element of a first type and the selected information element of a second type.

A second embodiment of said device according to the invention is provided with an input (bus 3) for receiving a message which comprises a first information element of a second type and a second information element of a second type, memory means 13 for storing information elements of a first type, selection means 14 for selecting an information element of a first type which, at least in part, has substantially the same information content as the first information element of a second type, and an output (bus 6) for generating a message which comprises the first information element of a second type, the second information element of a second type, and the selected information element of a first type.

The invention also relates to a system based on at least one protocol version, for exchanging a message with another system based on at least one protocol version, the message comprising at least one information element of a specific type, which system is provided with the device (or an embodiment thereof) according to the invention. In this case it is possible, for example, to implement the device in the system entirely by means of software.

Figure 3:
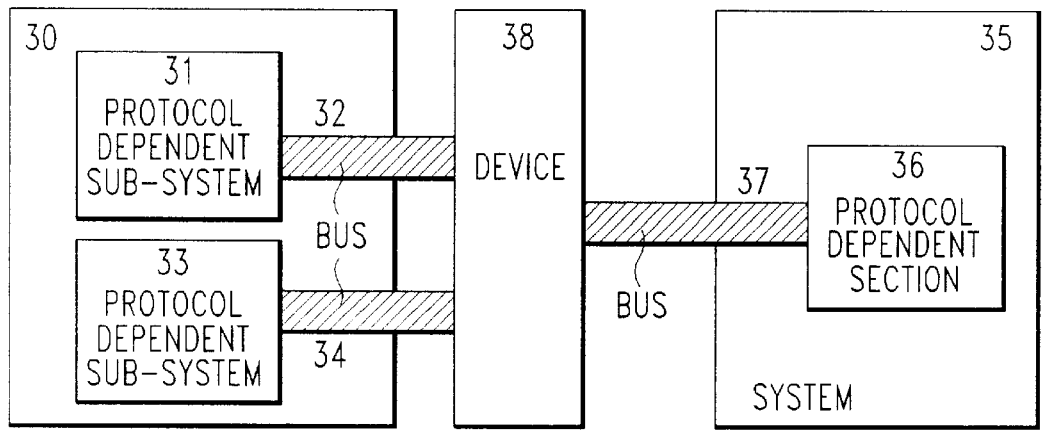
FIG. 3 shows two systems which are based, respectively, on two protocol versions and on one protocol version, with a second device according to the invention situated between the systems.

The unit depicted in FIG. 3 consists of a system 35, of which a protocol-dependent section 36, based on one protocol version, is linked, via a bus 37, to second device 38. Device 38 is further linked, via a bus 32, to protocol-dependent subsystem 31, based on a first protocol version, of a system 30 and is further linked, via a bus 34, to a protocol-dependent subsystem 33, based on a second protocol version, of said system 30. If a section (or subsystem) of a system is based on a first (lower) protocol version, this will result, for example, in the (subsystem dispatching a message which comprises an information element of a first type, and if a section (or subsystem) of a system is based on a second (higher) protocol version, this will result, for example, in the (sub)system dispatching a message which comprises an information element of a second type. In this situation, a message consists, for example, of eight bytes A, B, C, D, E, F, G and H, a header being formed by bytes A and B, an information element of a first type being formed by bytes C and D, an information element of a second type being formed by bytes E and F, and a subsequent information element of a second type being formed by bytes G and H.

Figure 4:
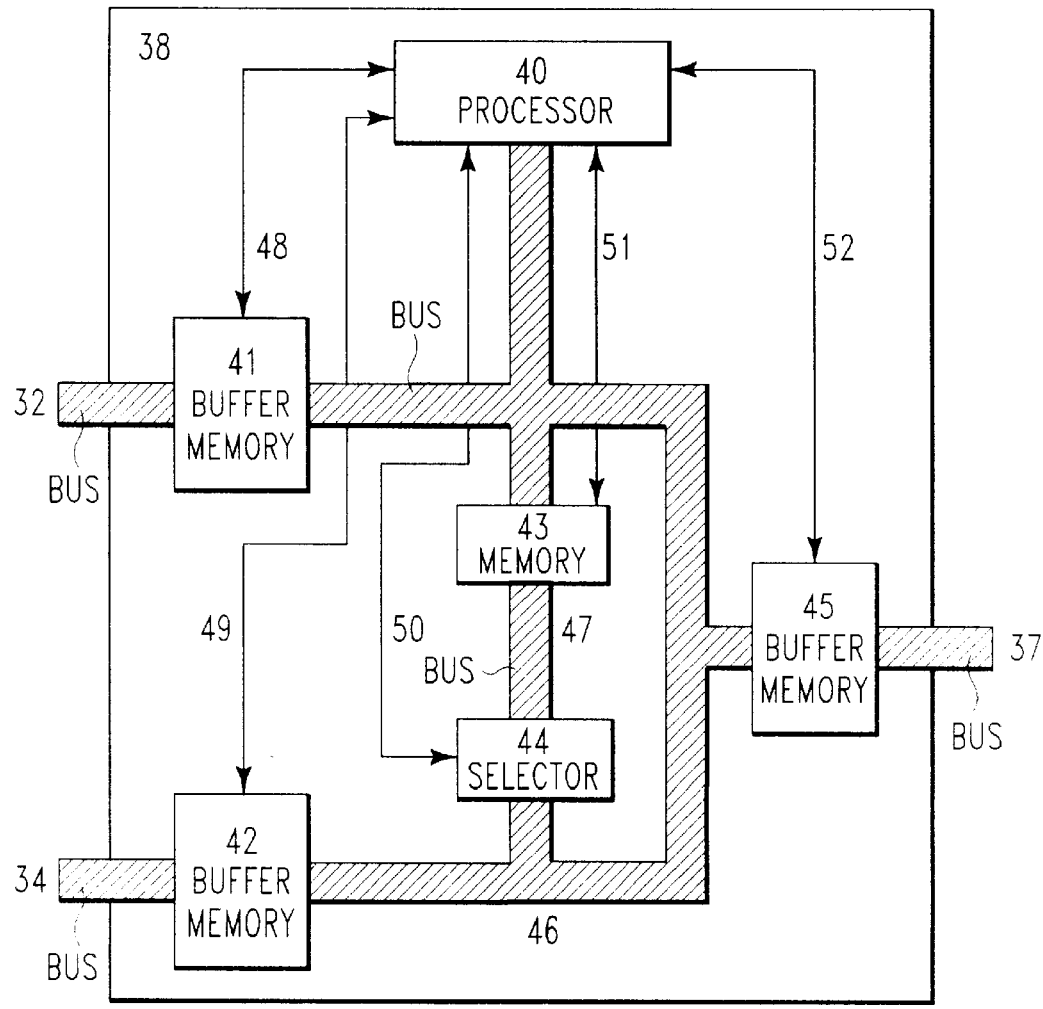
FIG. 4 shows the second device according to the invention.

The second device 38, depicted in FIG. 4, comprises a processor 40, a buffer memory 41 linked to bus 32, a buffer memory 42 linked to bus 34, memory means 43, selection means 44, and a buffer memory 45 linked to bus 37. Memory means 43 and selection means 44 are mutually linked via a bus 47, and are each, like processor 40, buffer memory 41 and buffer memory 42 and buffer memory 45, linked to a bus 46, via which bus 46 the internal data exchange in device 38 takes place. Further, processor 40 is linked, via a control link 48, to buffer memory 41, via a control link 49, to buffer memory 42, via a control link 50, to selection means 44, via a control link 51, to memory means 43 and, via a control link 52, to buffer memory 45.

The mode of operation of device 38 in one direction is as follows. A message which comes from subsystem 31 and comprises an information element of a first type (bytes C and D) is fed, via bus 32, to buffer memory 41 of device 38. By means of a control signal via control link 48, processor 40 is informed of the arrival of said message. In response to the control signal, the message, via bus 46, is analyzed by processor 40 (either by analysis of the header, bytes A and B, or by analysis of the content of the remaining portion of the message, bytes C, D, E, F, G and H). Then, the information element of a first type (bytes C and D) of the message is fed, via bus 46, to selection means 44 which, for example, store said information element (bytes C and D) in response to a control signal coming from processor 40 via control link 50. Thereafter, processor 40 is informed of the arrival of said information element (bytes C and D). In response to a control signal coming from processor 40, via control link 51, memory means 43 successively generate various information elements stored in memory means 43, of a first type, which are supplied to selection means 44 via bus 47. To this end, memory means 43 are equipped, for example, with a table having two columns, the first column comprising information elements of a first type and the second column comprising information elements of a second type, whereinformation elements, situated on the same row, of a first and second type, respectively, have, at least in part, substantially the same information content. Selection means 44 compare each information element of a first type which has arrived via bus 46 with the stored information element of a first type (bytes C and D) and in case of identity inform processor 40 by means of a control signal via control link 50. In response thereto, processor 40 generates a subsequent control signal via control link 51 to memory means 43 which, in response thereto, generate that information element of a second type which is situated on the same row as the selected information element of a first type. Said selected information element of a second type is fed, via bus 46, to buffer memory 45 which stores said selected information element of a second type in response to a control signal coming from processor 40 and supplied via control link 52 (bytes E and F). Then, the remaining portion of the message (bytes A, B, C, D, G and H) stored in buffer memory 41 is fed, via bus 46, to buffer memory 45 which stores said remaining portion of the message, whereupon the message which has thus been stored in buffer memory 45 and which now comprises both an information element of a first type (bytes C and D) and an information element of a second type (bytes E and F) can be dispatched to system 35 via bus 37. Independent of the protocol version on which section 36 of system 35 is based, system 35 now can process this message without it having been necessary when the second protocol version was designed to take the first protocol version very much into account.

The mode of operation of device 38 in one direction further is as follows. A message which comes from subsystem 33 and comprises an information element of a second type (bytes E and F) is fed, via bus 34, to buffer memory 42 of device 38. By means of a control signal via control link 49, processor 40 is informed of the arrival of said message. In response to the control signal, the message, via bus 46, is analyzed by processor 40 (either by analysis of the header, bytes A and B, or by analysis of the content of the remaining portion of the message, bytes C, D, E, F, G and H). Then the information element of a second type (bytes E and F) of the message is fed, via bus 46, to selection means 44 which, for example, store said information element (bytes E and F), in response to a control signal coming from processor 40 via control link 50. Thereafter, processor 40 is informed of the arrival of said information element (bytes E and F). In response to a control signal coming from processor 40 via control link 51, memory means 43 successively generate various information elements, stored in memory means 43, of a second type, which are supplied to selection means 44 via bus 47. To this end, memory means 43 are equipped, for example, with a table having two columns, the first column comprising information elements of a first type and the second column comprising information elements of a second type, where information elements, situated on the same row, of a first and second type, respectively, have, at least in part, substantially the same information content. Selection means 44 compare each information element of a second type which has arrived via bus 46 with the stored information element of a second type (bytes E and F) and in case of identity inform processor 40 by means of a control signal via control link 50. In response thereto, processor 40 generates a subsequent control signal via control link 51 to memory means 43 which, in response thereto, generate that information element of a first type which is situated on the same row as the selected information element of a second type. The selected information element of a first type is fed, via bus 46, to buffer memory 45 which stores the selected information element of a first type in response to a control signal coming from processor 40 and supplied via control link 52 (bytes C and D). Then the remaining portion of the message (bytes A, B, E, F, G and H) stored in buffer memory 42 is fed, via bus 46, to buffer memory 45 which stores said remaining portion of the message, whereupon the message which has thus been stored in buffer memory 45 and which now comprises both an information element of a first type (bytes C and D) and an information element of a second type (bytes E and F) can be dispatched to system 35 via bus 37. Independent of the protocol version on which section 36 of system 35 is based, system 35 now can process this message without it having been necessary when the second protocol version was designed to take the first protocol version very much into account.

The mode of operation of device 38 in another direction is as follows. A message which comes from system 35 is fed, via bus 37, to buffer memory 45 of device 38. By means of a control signal via control link 52, processor 40 is informed of the arrival of said message. In response to the control signal, the message, via bus 46, is analyzed by processor 40 (either by analysis of the header, bytes A and B, or by analysis of the content of the remaining portion of the message, bytes C, D, E, F, G and H). Any information element of a first type (bytes C and D) which may be present is fed to buffer memory 41, via bus 46, and is stored in response to a control signal supplied via control link 48, after which it can be dispatched to subsystem 31 via bus 32. Any information element of a second type (bytes E and F) which may be present and any subsequent information element of a second type (bytes G and H) which may be present are fed to buffer memory 42, via bus 46, and are stored in response to a control signal supplied via control link 49, after which they can be dispatched to subsystem 33 via bus 34. In general, only either the information element of the first type or the group of information elements of the second type will be passed on, or the information element of the first type and the group of information elements of the second type will be passed on with some time in between. This is then implemented by means of delay means and/or disabling means known to those skilled in the art.

Supplementing messages with headers is obviously necessary if a message might have different destinations. In the case of only one possible destination, a header which has merely a destination function could be dispensed with. A header which indicates in addition, what information elements of what type are present, cannot be dispensed with in that case.

Obviously, a message which at a low level is formed by bytes and which is then provided by device 7, 38 with other bytes, could also be at a higher level, in which case it is formed, for example, by software-type calls and then is provided by device 7, 38 with other software-like calls. In that case, memory means 13, 43 store the information elements, for example in the form of software-like calls, and selection means 14, 44 then select corresponding software-like calls.

Device 7 should further have the option of passing on messages directly from buffer memory 11 to buffer memory 12 and vice versa, if it proves unnecessary to supplement certain messages with additional information elements, for example because corresponding systems are situated on the one side and on the other side of device 7. The same applies to device 38.

We claim:

1. A device for exchanging a message, comprising at least one information element, between a first communication system utilizing a first communication protocol and a second communication system utilizing a second communication protocol, wherein the first communication protocol utilizes, as a message field in a first communication message, a first information element of a first type and the second communication protocol utilizes, as a message field in a second communication message, a second information element of the second type, the first and second protocols being different versions of a common communication protocol with the second communication protocol being a higher version than the first communication protocol and having a protocol procedure not contained in the first communication protocol such that the second information element can not be processed through the first communication protocol, the device comprising:

an input portion for receiving an incoming message, generated through use of the second communication protocol, containing the second information element of the second type;

a memory for storing a plurality of information elements of the first type therein so as to define stored information elements of the first type;

a selector, operative in conjunction with the memory and the input portion, for selecting, from among the stored information elements of the first type and in response to the second information element of the second type contained in the incoming message, one of the stored information elements of the first type or a portion of the said one of the stored information elements of the first type as a selected information element of the first type, wherein the selected information element of the first type and the second information element of the second type have substantially equivalent information contents; and an output portion, operative in conjunction with the selector and the input portion, for producing an outgoing message containing both the selected information element of the first type and the second information element of the second type whereby the outgoing message can be processed by either the first or second communication protocols.

2. The device recited in claim 1 further comprising:

another input portion for receiving another incoming message, generated through use of the first communication protocol, containing the first information element of the first type;

additional memory for storing a plurality of information elements of the second type therein so as to define stored information elements of the second type;

another selector, operative in conjunction with the additional memory and the other input portion, for selecting, from among the stored information elements of the second type and in response to the first information element of the first type contained in said other incoming message, one of the stored information elements of the second type or a portion of the said one of the stored information elements of the second type as a selected information element of the second type, wherein the selected information element of the second type and the first information element of the first type have substantially equivalent information contents; and another output portion, operative in conjunction with the other selector and the other input portion, for producing another outgoing message containing both the selected information element of the second type and the first information element of the first type whereby the outgoing message can be processed by either the first or second communication protocols.

3. The device recited in claim 1 wherein:

the input portion receives, as the incoming message, an input message generated through use of the second communication protocol and containing a first information element of the second type and the second information element of the second type; and the output portion, operative in conjunction with the selector and the input portion, generates, as the outgoing message, an output message containing the first information element of the second type, the second information element of the second type and the selected information element of the first type.

* * * * *